United States Patent
Friedrich et al.

(10) Patent No.: US 12,508,576 B2
(45) Date of Patent: Dec. 30, 2025

(54) CATALYST FOR REDUCING AMMONIA EMISSIONS

(71) Applicant: UMICORE AG & CO. KG, Hanau-Wolfgang (DE)

(72) Inventors: Birgit Friedrich, Otzberg (DE); Gordon Keitl, Frankfurt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 813 days.

(21) Appl. No.: 17/636,554

(22) PCT Filed: Aug. 18, 2020

(86) PCT No.: PCT/EP2020/073040
§ 371 (c)(1),
(2) Date: Feb. 18, 2022

(87) PCT Pub. No.: WO2021/032702
PCT Pub. Date: Feb. 25, 2021

(65) Prior Publication Data
US 2022/0297093 A1   Sep. 22, 2022

(30) Foreign Application Priority Data

Aug. 20, 2019   (EP) ..................................... 19192428

(51) Int. Cl.
*B01J 23/42*  (2006.01)
*B01D 53/94*  (2006.01)
(Continued)

(52) U.S. Cl.
CPC ............... *B01J 23/42* (2013.01); *B01J 35/40* (2024.01); *B01J 35/45* (2024.01); *B01J 35/77* (2024.01);
(Continued)

(58) Field of Classification Search
CPC ...... F01N 3/0807; F01N 3/0814; F01N 3/105; F01N 3/106; F01N 3/2066; F01N 3/281;
(Continued)

(56) References Cited

U.S. PATENT DOCUMENTS 5,997,830 A * 12/1999 Itoh ......................... B01J 35/19
                                                    423/239.1
8,524,185 B2   9/2013 Caudle et al.
(Continued)

FOREIGN PATENT DOCUMENTS

CN   103476495 A   12/2013
CN   104582843 A   4/2015
(Continued)

OTHER PUBLICATIONS

International Search Report for PCT/EP2020/073040, dated Nov. 13, 2020 (7 pgs. with English Translation).
(Continued)

*Primary Examiner* — Binh Q Tran
(74) *Attorney, Agent, or Firm* — Smith, Gambrell & Russell, LLP

(57) ABSTRACT

The present invention relates to a composition comprising platinum supported on titanium oxide, the platinum particles having an average particle diameter of 50-200 nm. The composition has a surprisingly low light-off temperature for the ammonia oxidation and a high selectivity for oxidation to N2.

21 Claims, 4 Drawing Sheets

Figure 1:
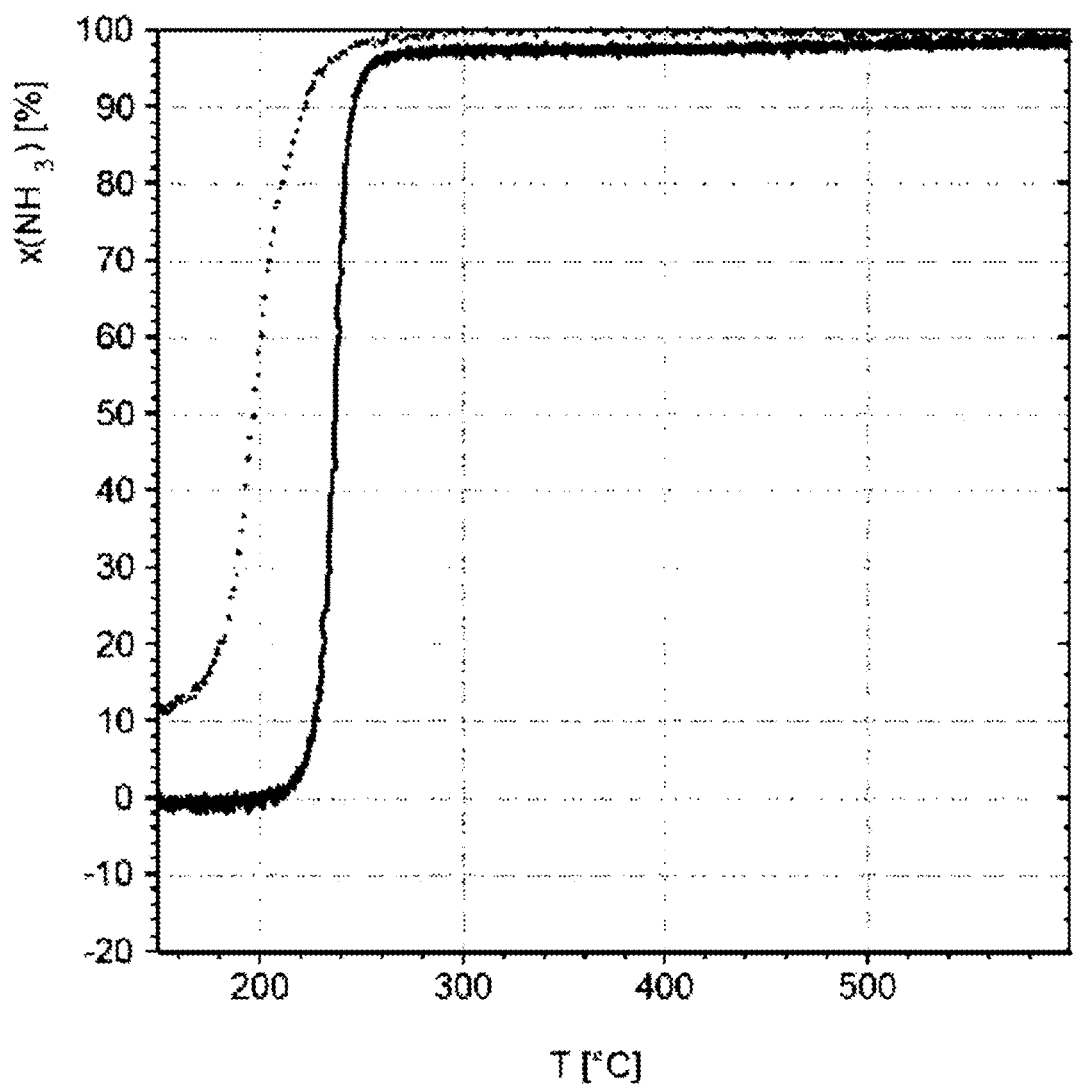

(51) Int. Cl.

| | |
|---|---|
| *B01J 23/40* | (2006.01) |
| *B01J 23/56* | (2006.01) |
| *B01J 29/70* | (2006.01) |
| *B01J 35/40* | (2024.01) |
| *B01J 35/45* | (2024.01) |
| *B01J 35/77* | (2024.01) |
| *B01J 37/02* | (2006.01) |
| *B01J 37/08* | (2006.01) |
| *F01N 3/08* | (2006.01) |
| *F01N 3/10* | (2006.01) |
| *F01N 3/28* | (2006.01) |

(52) U.S. Cl.
CPC .......... *B01J 37/0225* (2013.01); *B01J 37/08* (2013.01); *F01N 3/105* (2013.01); *F01N 3/281* (2013.01); *B01D 53/9418* (2013.01); *B01D 53/9422* (2013.01); *B01J 23/40* (2013.01); *B01J 23/56* (2013.01); *B01J 29/7049* (2013.01); *F01N 3/0814* (2013.01); *F01N 2370/02* (2013.01); *F01N 2510/063* (2013.01); *F01N 2510/0682* (2013.01); *F01N 2570/14* (2013.01); *F01N 2570/18* (2013.01)

(58) Field of Classification Search
CPC ............ F01N 2240/25; F01N 2370/02; F01N 2370/04; F01N 2510/0682; F01N 2570/14; F01N 2570/18; F01N 2510/06; F01N 2510/063; F01N 2510/0684; F01N 2610/02; B01J 23/40; B01J 23/42; B01J 23/56; B01J 29/7049; B01J 35/40; B01J 37/0225; B01J 37/08; B01J 35/19; B01J 35/23; B01J 21/063; B01J 21/08; B01D 53/8634; B01D 53/9413; B01D 53/9418; B01D 53/9422; B01D 53/9436; B01D 53/9477; B01D 2251/2062; B01D 2255/102; B01D 2255/1021; B01D 2255/20707; B01D 2255/9202; B01D 2258/012; Y02T 10/12

See application file for complete search history.

(56) References Cited

U.S. PATENT DOCUMENTS

| | | | |
|---|---|---|---|
| 8,980,786 B2 | 3/2015 | Murakami et al. | |
| 9,011,809 B2 | 4/2015 | Ito et al. | |
| 10,188,987 B2 | 1/2019 | Li et al. | |
| 11,213,789 B2 | 1/2022 | Hilgendorff et al. | |
| 11,691,123 B2* | 7/2023 | Gao | B01J 35/40 502/350 |
| 2003/0185736 A1 | 10/2003 | Katanaka | |
| 2006/0135359 A1* | 6/2006 | Adzic | H01M 4/921 429/506 |
| 2008/0292519 A1 | 11/2008 | Caudle | |
| 2009/0011177 A1 | 1/2009 | Kubo | |
| 2010/0166628 A1 | 7/2010 | Soeger et al. | |
| 2011/0053020 A1* | 3/2011 | Norton | C01B 3/16 502/343 |
| 2013/0172177 A1* | 7/2013 | Domke | B01J 37/088 502/262 |
| 2014/0157763 A1 | 6/2014 | Chandler | |
| 2014/0212350 A1 | 7/2014 | Andersen | |
| 2015/0037233 A1 | 2/2015 | Fedeyko | |
| 2015/0078966 A1* | 3/2015 | Okajima | F01N 3/103 422/172 |
| 2016/0228852 A1* | 8/2016 | Biberger | B01J 37/349 |
| 2016/0236179 A1* | 8/2016 | Chiffey | B01J 37/038 |
| 2018/0078926 A1 | 3/2018 | Chen | |
| 2019/0082358 A1 | 3/2019 | Woerner | |
| 2019/0126247 A1* | 5/2019 | Deeba | B01D 53/945 |
| 2019/0160427 A1* | 5/2019 | Deeba | B01J 35/23 |
| 2019/0388838 A1* | 12/2019 | Luo | B01D 53/9472 |
| 2020/0114339 A1* | 4/2020 | Masuda | B01J 29/46 |

FOREIGN PATENT DOCUMENTS

| | | |
|---|---|---|
| CN | 107262090 A | 10/2017 |
| CN | 107667209 A | 2/2018 |
| CN | 107949436 A | 4/2018 |
| DE | 10 2017 122 001 A1 | 3/2018 |
| EP | 1 547 682 A1 | 6/2005 |
| EP | 3 210 989 B1 | 9/2018 |
| JP | 09-103651 A | 4/1997 |
| JP | 2005-186002 A | 7/2005 |
| JP | 2010-149097 A | 7/2010 |
| JP | 2013-166136 A | 8/2013 |
| WO | 2010/062730 A2 | 6/2010 |
| WO | 2010/073956 A1 | 7/2010 |
| WO | 2012/127540 A1 | 9/2012 |
| WO | 2016/205506 A1 | 12/2016 |

OTHER PUBLICATIONS

Written Opinion of the International Searching Authority for PCT/EP2020/073040, dated Nov. 13, 2020 (14 pgs.).

J. Rymes, Studies in Surface Science and Catalysis 143, Scientific Bases for the Preparation of Heterogeneous Catalysts, 2002 (pp. 121-129) ISBN: 978-0-444-51178-2. XP002672135.

English Translation of Chinese Office Action dated Apr. 27, 2023 for Chinese Patent Application No. 202080056683.6 (17 pages).

Communication from the Examining Division dated Mar. 5, 2024 for European Patent Application No. 19192428.1 (5 pages in German; 5 page English translation).

Extended European Search Report mailed Mar. 6, 2020 for European Patent Application No. 19192428.1 (7 pages in German with English machine translation).

Translation of the Written Opinion of the International Searching Authority dated Nov. 13, 2020 for International Patent Application No. PCT/EP2020/073040 (8 pages).

International Preliminary Report on Patentability dated Feb. 17, 2022 for International Patent Application No. PCT/EP2020/073040 (15 pages in German with English Translation).

Examination Report mailed Aug. 14, 2024 in Indian Patent Application No. 202247013982 (7 pages).

Lee, Jaesang, et al. Selective Photocatalytic Oxidation of $NH_3$ to $N_2$ on platinized $TiO_2$ in water. Environ Sci Technol. 2002. Vol. 36, No. 24, pp. 5462-5468.

Yamazoe, Seiji, et al. Mechanism of Photo-Oxidation of $NH_3$ over $TiO_2$: Fourier Transform Infrared Study of the Intermediate Species. The Journal of Physical Chemistry C. 2007. vol. 111, No. 29, pp. 11077-11085.

Siwinska, Katarzyna, et al. Advanced Hybrid Materials Based on Titanium Dioxide for Environmental and Electrochemical Applications. Chapter 7 of Titanium Dioxide. 2017. Intech Open. pp. 143-186.

Notice of Reasons for Refusal mailed Sep. 30, 2024 for Japanese Patent Application No. 2022-503538 (8 pages in Japanese; 7 pages English translation).

Communication from the Examining Division mailed May 6, 2025 in European Patent Application No. 20754284.6 (4 pages in German; 4 pages English Translation).

Decision of Refusal mailed May 7, 2025 for Japanese Patent Application No. 2022-503538 (3 pages in Japanese; 3 pages English translation).

Written Opinion mailed Jan. 6, 2025 for Japanese Patent Application No. 2022-503538 (3 pages in Japanese; 3 pages English translation).

* cited by examiner

CATALYST FOR REDUCING AMMONIA EMISSIONS

Increasingly stringent requirements are imposed on cleaning the exhaust gases of motor vehicles. While particles can be removed by filtration, incompletely combusted hydrocarbons (HC), carbon monoxide (CO) and nitrogen oxides ($NO_x$) must be converted to water, carbon dioxide and nitrogen. This takes place via catalytically active solids, which are generally applied as a coating to carrier substrates.

Both flowthrough substrates and filter substrates may be used as carrier substrates for these catalysts. Flowthrough substrates are known to the person skilled in the art and are commercially available. They consist, for example, of cordierite, aluminum titanate or metal foil.

So-called corrugated substrates may also be used as flowthrough substrates. These are known to the person skilled in the art as substrates made of corrugated sheets consisting of inert materials. Suitable inert materials are, for example, fibrous materials having an average fiber diameter of 50 to 250 μm and an average fiber length of 2 to 30 mm. Fibrous, heat-resistant materials made of silicon dioxide, in particular glass fibers, are preferred.

For the production of such carrier substrates, sheets of the aforementioned fiber materials are, for example, corrugated in the known manner and the individual corrugated sheets are formed into a cylindrical monolithically structured body with channels running through the body. Preferably, a monolithically structured body with a crosswise corrugation structure is formed by stacking a number of the corrugated sheets into parallel layers with different orientation of the corrugation between the layers. In one embodiment, flat sheets can be arranged between the corrugated sheets.

Metal carrier substrates generally consist of structures made of corrugated metal sheets into which flat metal sheet layers can also be incorporated. These metal sheets are generally wound so that channel structures form, whose channels run in parallel and extend from one end of the substrate to the other end. The metal sheets can be continuous or provided with holes, in order to allow gas exchange between the channels. In addition, these metal sheet structures can be shaped in such a way that potential particle emissions are collected by the structure (so-called open filter substrates).

A wall-flow filter is a carrier body comprising channels of length L, which extend in parallel between a first and a second end of the wall-flow filter, are alternately closed at either the first or the second end and are separated by porous walls. They consist, for example, of silicon carbide, aluminum titanate, or cordierite.

In an uncoated state, wall-flow filters have porosities of, for example, 30 to 80%, in particular 50 to 75%. In the uncoated state, their average pore size is 5 to 30 micrometers, for example.

Generally, the pores of the wall-flow filter are so-called open pores, i.e., they have a connection to the channels. Furthermore, the pores are generally interconnected with one another. This enables, on the one hand, easy coating of the inner pore surfaces and, on the other hand, easy passage of the exhaust gas through the porous walls of the wall-flow filter.

Precious metals, in particular, are used in exhaust gas catalysis as catalytically active solids. Due to the high precious metal prices, the best possible utilization of these precious metals is an important point of catalyst development. A high surface area is achieved when using small precious metal particles, wherein the ideal particle size can vary depending on the application, carrier metal and noble metal.

EP1547682A1 discloses platinum catalysts supported on $SiO_2$—$Al_2O_3$, wherein two of these catalysts are arranged sequentially and the front catalyst has smaller platinum particles than the rear catalyst. The optimal platinum particle size is 20 nm.

Rymes et al ("Pt combustion catalysts prepared from w/o microemulsions"; Studies in Surface Science and Catalysts 143, Elsevier Science B.B. 2002 p. 121-129) investigated the influence of the platinum particle size of platinum catalysts supported on aluminum oxide pellets on the $T_{50}$ temperature for the oxidation of certain hydrocarbons. The ideal particle size is 55 nm.

JPH09103651A describes an exhaust system for NOx reduction. The ideal platinum particle size is 37 nm.

US2009/0011177A1 discloses platinum colloids having a particle size of up to 271 nm on γ-aluminum oxide for NO oxidation.

US2003/0185736A1 describes new carrier oxides, their production as carriers for platinum, palladium and/or rhodium having a particle size of up to 45 nm for exhaust gas aftertreatment, in particular the conversion of nitrogen oxides.

DE102017122001A1 discloses an ammonia slip catalyst (ASC) of ruthenium or platinum and ruthenium on a carrier oxide with rutile phase.

Platinum catalysts with platinum particle sizes of 150-500 nm are described in JP2010149097A.

In the case of lean-burn engines, the conversion of HC and CO via oxidation catalysts is possible, but the reduction of NOx to nitrogen is not. Either the use of NOx storage catalysts or the use of so-called SCR catalysts is required for selective catalytic reduction (SCR). While NOx storage catalysts have to be periodically regenerated, this is not required for SCR catalysts.

However, the use of SCR catalysts requires the addition of reducing agents. Common practice is the injection of an aqueous solution of urea into the exhaust gas system upstream of the SCR catalyst. At temperatures above 175° C., ammonia and $CO_2$ are formed by hydrolysis:

$$(NH_2)_2CO+H_2O \rightarrow 2NH_3+CO_2$$

The ammonia formed in turn serves as a reducing agent for reducing the nitrogen oxides to nitrogen via the SCR catalyst:

$$x\ NH_3+y\ NO_x(+O_2) \rightarrow \tfrac{1}{2}(x+y)N_2+3x/2H_2O$$

The reaction proceeds particularly quickly at a ratio of $NO/NO_2 \approx 1$:

$$2NH_3+NO+NO_2 \rightarrow 2N_2+3H_2O$$

In order to achieve the most complete possible conversion of the nitrogen oxides, the urea is slightly overdosed. This in turn leads to unconverted ammonia in the exhaust gas, which is undesirable due to its toxic effect and is the reason why ammonia emissions are increasingly limited in exhaust gas legislation.

For this reason, so-called ammonia slip catalysts (ASC) are used which convert unconverted ammonia via the SCR catalyst. The ammonia is oxidized to nitrogen:

$$4NH_3+3O_2 \rightarrow 2N_2+6H_2O$$

The catalyst components active for ammonia oxidation are referred to below as AMOX.

In comparison to palladium and rhodium catalysts, platinum catalysts exhibit the highest ammonia oxidation activity (Hansen T. K. (2017). Kgs. Lyngby: Technical Univ. of Denmark (DTU)).

Aluminum oxide ($Al_2O_3$) is generally used for the AMOX component as carrier material for the precious metal, since it has excellent thermal stability. However, conventional $Al_2O_3$-supported AMOX catalysts have insufficient selectivity for the oxidation to nitrogen ($N_2$). As undesired side reactions, oxidation of ammonia to $NO_x$ and $N_2O$ occurs. This is of course counterproductive for reducing the nitrogen oxides. In addition, $N_2O$ is also problematic due to its greenhouse gas effect.

In order to increase selectivity, the above AMOX catalyst is also combined with SCR-active catalyst compositions (WO2016/205506A1, US2008/292519A1, US2014/212350A1, US2014/0157763A1, US2015/037233A1). These SCR-active compositions can be applied onto the AMOX catalyst layer mixed with the AMOX catalyst in one layer or both mixed in one layer and additionally in an upper layer. These combinations allow the selectivity of the catalyst to $N_2$ to be increased by subsequent reduction of $NO_x$ and, as a whole, constitute the ammonia slip catalyst (ASC).

However, $N_2O$ reduction over the platinum catalyst is negligible. $N_2O$ formation must therefore be kept as low as possible.

The object of this invention is therefore to provide a platinum catalyst which has both high ammonia oxidation activity, but also a good selectivity for oxidation to nitrogen and which minimizes the harmful by-products.

The invention relates to a composition which has both a surprisingly low light-off temperature for ammonia oxidation and a high selectivity for oxidation to $N_2$.

The invention is described in detail below:

The invention relates to a composition comprising platinum in the form of platinum particles supported on metal oxide A, wherein the platinum particles have an average particle diameter of 50-200 nm, preferably 80-120 nm, wherein metal oxide A is titanium oxide.

Within the scope of this invention, the 'average particle diameter' is the average diameter of the Pt crystallites, which is calculated from X-ray diffraction images on the basis of the [111] main reflex at approximately 39.8° 2Theta over the peak width (full width at half maximum; FWHM). Here, a silicon with a peak at 28.4° 2Theta and a FWHM of 0.06° 2Theta is used as standard.

In one embodiment variant, the composition contains no precious metal other than platinum. Precious metals that are not contained in this embodiment variant are, in particular, palladium, rhodium, ruthenium, iridium, gold and silver.

In a preferred embodiment, the titanium oxide, which is predominantly present as titanium dioxide, includes the crystalline phases anatase and rutile. The anatase and rutile phases are preferably present in a ratio of greater than 9:1.

The platinum loading of the metal oxide A is in particular in the range of 0.5-20% by weight, preferably 3-8% by weight, based on the metal oxide A.

The temperature stability of the metal oxide A can be increased by doping with silicon oxide, wherein preferably a silicon oxide content of 1-10% by weight is used in the metal oxide A.

In one embodiment, the metal oxide A supported with platinum is mixed with another metal oxide, namely metal oxide B. Aluminum oxide, titanium oxide, silicon oxide, cerium oxide, or zirconium oxide may be used for metal oxide B. Mixtures of these oxides or their mixed oxides can also be used. Metal oxide B may be different from metal oxide A. However, metal oxide A and metal oxide B are preferably the same metal oxide, wherein metal oxide B in one embodiment carries precious metal, for example platinum, palladium and/or rhodium, and in another embodiment does not carry precious metal.

In addition, the invention includes a method for producing the composition according to the invention with platinum particles supported on metal oxide A, wherein the platinum is deposited from a solution on the metal oxide A and is subsequently subjected to a thermal treatment at 700° C. to 900° C. after drying, whereby the platinum is fixed on the metal oxide.

The invention further includes a catalyst, wherein the composition according to the invention is applied in the form of a coating to a ceramic carrier substrate of length L.

In one embodiment variant of the catalyst according to the invention, the composition is applied over at least 80% of the total length of the carrier substrate. As complete a coating as possible causes the greatest possible contact time of the exhaust gas with the catalyst and thus the highest possible ammonia conversion.

In a further embodiment variant of the catalyst according to the invention, the composition is coated over 10% to 80% of the entire length of the carrier substrate and thus enables a zoned catalyst design.

For the catalyst according to the invention, the composition according to the invention can be applied to a carrier substrate together with another catalytically active composition, in particular with a composition active for the SCR reaction.

In addition, the invention comprises a catalyst in which the composition according to the invention and another catalytically active composition are arranged in different zones and/or layers.

The carrier substrate used for the aforementioned catalysts may be made of ceramic or metal. It can be, for example, a flowthrough substrate. A so-called corrugated substrate can also be used as the carrier substrate. Filter substrates may also be used.

The invention also includes a catalyst system, wherein the catalyst according to the invention is used.

The invention also comprises a method for reducing nitrogen oxides in exhaust gases of lean-burn internal combustion engines, wherein the exhaust gas is passed over an exhaust gas system that comprises a catalyst for the selective reduction of nitrogen oxides (SCR) and an ammonia slip catalyst (ASC) downstream of the exhaust gas stream, wherein the ASC is the catalyst according to the invention The SCR catalyst can be a vanadium oxide-based catalyst or a zeolite-based catalyst of the Fe-zeolite or Cu-zeolite type.

Zeolites are two-dimensional or three-dimensional structures, the smallest substructures of which can be considered as $SiO_4$ and $AlO_4$ tetrahedra. These tetrahedra form larger structures, wherein two are respectively connected to one another via a common oxygen atom. Differently sized ring structures, such as ring structures of 4, 6, or even nine tetrahedrally coordinated Si or Al atoms, can thus be formed. The various zeolite types are often defined by the largest ring size, since this size determines which guest molecules can penetrate the zeolite structure. Usually, a distinction is made between large-pore zeolites with a ring size of up to 12 tetrahedra, medium-pore zeolites with a ring size of up to 10 tetrahedra and small-pore zeolites with a ring size of up to 8 tetrahedra. The zeolites are divided by the Structural Commission of the International Zeolite Association into structure types, which are indicated by three-letter codes.

Both large-pore and medium-pore or small-pore zeolites can be used for the composition according to the invention. Examples of suitable zeolites belong to the structure types ABW, AEI, AFX, BEA, CHA, DDR, ERI, ESV, FAU, FER, KFI, LEV, LTA, MER MFI, MWW, SOD or STT. A small-pore zeolite of the structure type AEI, AFX, CHA or LEV is preferred. A zeolite of the structure type CHA is particularly preferred. An Si:Al ratio of 2 to 100, particularly preferably of 5:50, and further preferably of 10:40 is used.

Within the scope of the present invention, the term 'zeolite' also includes molecular sieves, which are occasionally referred to as 'zeolite-like structures.' Molecular sieves of the aforementioned structure types are preferably used. Examples include silicon-aluminum-phosphate zeolites, which are also referred to as SAPO, and aluminum-phosphate zeolites, which are known as AlPO.

The coating of the carrier substrates can be prepared according to methods familiar to the person skilled in the art, for example according to the common dip-coating method or pump-coating and suction-coating methods with subsequent thermal aftertreatment (calcination). The person skilled in the art is aware that, in the case of wall-flow filters, their average pore size and the average particle size of the materials to be coated can be matched to each other in such a manner that they lie on the porous walls that form the channels of the wall-flow filter (on-wall coating). The mean particle size of the materials to be coated can also be selected such that they are located in the porous walls that form the channels of the wall-flow filter; i.e., that the inner pore surfaces are coated (in-wall coating). In this case, the mean particle size of the materials to be coated must be small enough to penetrate into the pores of the wall-flow filter.

Zoned catalysts may be designed differently. For example, a zone provided with the composition according to the invention or mixed with another catalytically active composition may extend from one end (A) of the substrate over the length $L_A$=20% to 80% of the entire substrate length L, whereas a further zone extends from the other end (B) of the substrate over $L_B$=20% to 80% of the substrate length L. In this case, the zones can overlap, touch, or be designed with gap. For example, the composition according to the invention may be applied over the length $L_a$, while an SCR coating is applied over $L_b$. When overlapping, the zone of length $L_b$ may extend over the zone $L_a$ and thus assume the subsequent reduction of $NO_x$ to $N_2$, as described above. In the latter case, $L_b$ can also be selected identically to the length of the substrate.

When using a wall-flow filter, it is also possible to coat the input channels with an SCR-active coating and the outlet channels with an ASC coating, wherein the composition according to the invention is perfectly suitable as the AMOX-active component of the ASC coating. In this case, zoning over the length of the substrate can additionally be used.

The composition according to the invention is perfectly suitable for use as an ammonia oxidation catalyst in a system for reducing nitrogen oxides in the exhaust gases of lean-burn internal combustion engines. Such a system including a catalyst for the selective reduction of nitrogen oxides (SCR) and an ammonia slip catalyst (ASC) downstream of the exhaust gas stream, wherein the ASC includes the powder or powder mixture according to the invention with AMOX catalyst function.

The SCR catalyst for this can generally be selected from all catalysts active in the SCR reaction of nitrogen oxides with ammonia, in particular from those known as customary to the person skilled in the art in the field of automotive exhaust gas catalysis. This includes catalysts of the mixed-oxide type, as well as catalysts based upon zeolites—in particular, upon transition metal-exchanged zeolites.

An AMOX catalyst according to the invention is described below in comparison to a catalyst corresponding to the prior art.

EXAMPLE K1

By adding diluted nitric acid, the platinum is precipitated from aqueous solution of tetraethylammonium hexahydoxoplatinate (EP 3 210 989 B1) onto the titanium oxide powder stabilized with 5% by weight silicon oxide in order to obtain a material having a concentration of 3% by weight Pt (based on the titanium oxide powder). The powder thus produced is then filtered off, dried and fixed at 800° C. for 2 hours in an air atmosphere.

In order to produce a catalyst according to the invention, the powder is slurried in water and the desired loading of 0.14% by weight Pt (based on the total titanium oxide powder) is set by adding uncoated titanium oxide. A commercially available ceramic flowthrough substrate having the cell density of 400 cpsi and 110 μm wall thickness is coated in the usual way with this washcoat. The coated substrate is then dried at 110° C. and calcined at 600° C. for 6 hours. The washcoat loading of the catalyst is 25 g/l, the platinum loading of the catalyst is 0.0353 g/l.

COMPARATIVE EXAMPLE VK1

As a comparative reference, a catalyst having equal platinum content with γ-aluminum oxide as the carrier powder is used.

The platinum is precipitated from aqueous solution of tetraethylammonium hexahydoxoplatinate to the carrier powder by adding diluted nitric acid. γ-Aluminum oxide is used as carrier powder. The washcoat thus produced is then coated in the usual way onto a commercially available flowthrough substrate. The coated substrate is then dried at 110° C. and calcined at 600° C. for 6 hours. The washcoat loading of the catalyst is 25 g/l.

Drill cores with a diameter of 25.4 mm and a length of 76.2 mm were taken from the finished catalysts for measurement purposes. These drill cores were measured on a model gas system, wherein the gas composition and space velocity are selected as indicated in Table 1.

TABLE 1

| | Concentration: |
|---|---|
| GHSV [1/h] | 100000 |
| $O_2$ [Vol.-%] | 5 |
| $H_2O$ [vol %] | 5 |
| $NH_3$ [ppm] | 300 |
| $N_2$ | Remaining quantity |

Figure 2:
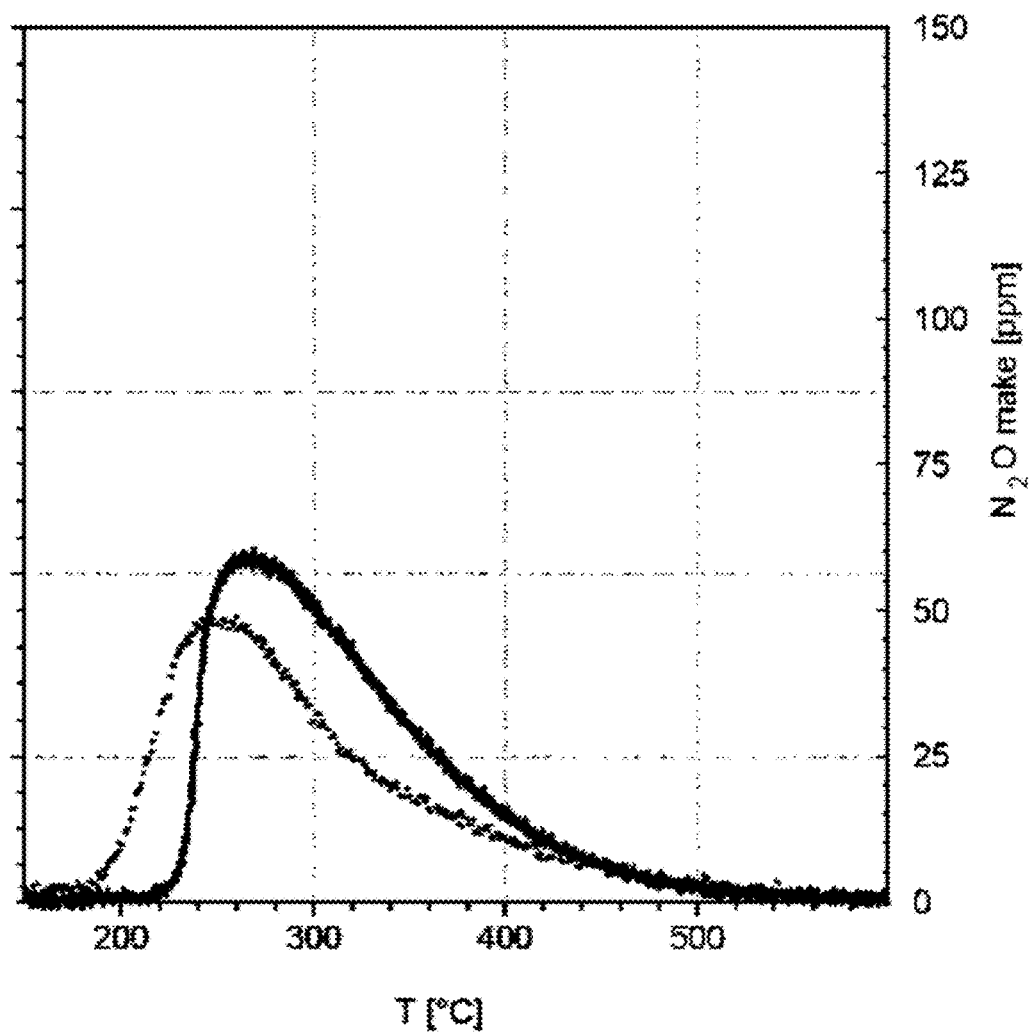

The results are shown comparatively in FIGS. 1 and 2.

FIG. 1 shows the conversion curve as a function of the temperature for K1 (dotted line) and the comparative example VK1 (solid line). As can be seen, the catalyst according to the invention has a significantly earlier light-off. While K1 achieves a 50% conversion already at 197° C., this is achieved only at 237° C. using VK1. In addition, a 10% conversion is achieved already at 150° C. with K1, while no conversion can be observed at this temperature with VK1.

FIG. 2 shows the selectivity to $N_2O$ for the two catalysts. Here as well, the result for K1 is shown as a dotted line and for VK1 as a solid line. It becomes clear that the AMOX catalyst according to the invention has a lower selectivity to $N_2O$ than the reference catalyst. The maximum measured $N_2O$ concentration in the exhaust gas after ASC was 47 ppm for K1, which equaled a 34% selectivity, and 60 ppm for VK1, which equaled a 44% selectivity.

Furthermore, K1 was measured for the size of its platinum particles. For this purpose, X-ray diffraction images were produced and the average particle size was calculated on the basis of the [111] main reflex at approximately 39.8° over the peak width (FWHM). In this way, an average particle diameter of 100 nm was determined.

It is surprising that a catalyst with such good selectivity and activity has such a large platinum particle diameter. In order to further investigate the influence of the platinum particle size on catalytic activity, the platinum particle size was varied by different aging of K1. The higher the aging temperature is selected under otherwise identical aging conditions, the greater the resulting platinum particle size due to particle sintering.

Figure 3:
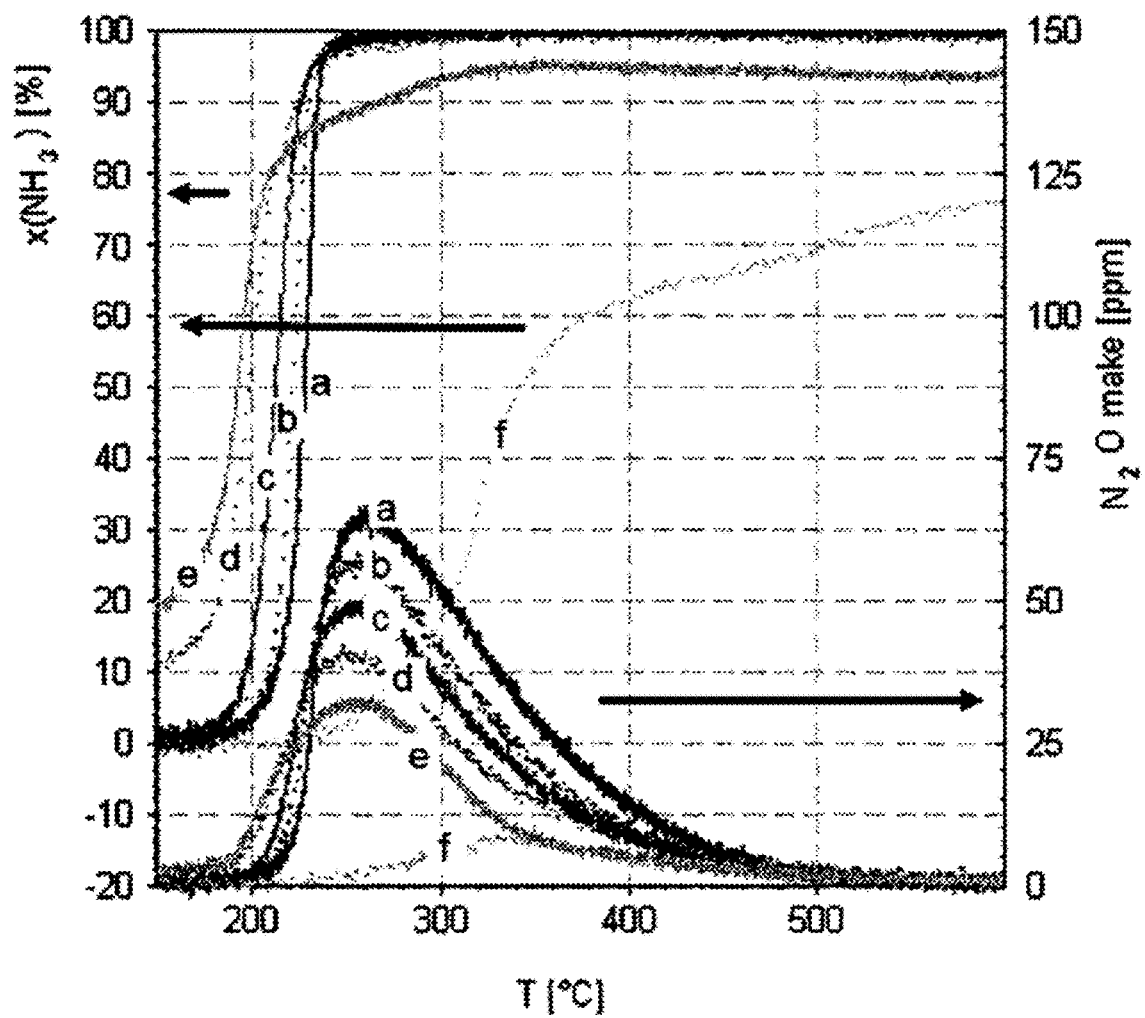

FIG. 3 shows the ammonia conversion over the catalyst K1 according to the invention fresh (a), and after aging of the catalyst under reducing atmosphere (10% $O_2$, 10% $H_2O$, remainder nitrogen) at 650° C. (b), 700° C. (c), 800° C. (d), 900° C. (e), and 1000° C. (f). The aging time was 16 h, with the exception of aging at 650° C., at which it was 12 h. As can be seen, a higher aging temperature, and thus a larger platinum particle diameter, leads to lower selectivity to $N_2O$ and to a reduction in the light-off temperature for ammonia conversion, until the maximum conversion of ammonia decreases at 900° C. and catalytic activity is greatly impaired at 1000° C. or higher. The range around 800° C. can therefore be regarded as a preferred temperature range for thermal pretreatment.

The influence of the mixture of the platinum-containing metal oxide with precious metal-free metal oxide was investigated using the catalysts K2-K4 according to the invention and will be described below.

EXAMPLE K2

The platinum is precipitated from aqueous solution of tetraethylammonium hexahydoxoplatinate (EP 3 210 989 B1) by adding diluted nitric acid to the titanium oxide powder stabilized with 5% by weight silicon oxide in order to obtain a material having a concentration of 3% by weight Pt (based on the titanium oxide powder). The powder thus produced is then filtered off, dried and fixed at 800° C. for 2 hours in an air atmosphere.

In order to produce the catalysts according to the invention, the powder is slurried in water and the desired loading of 0.4% by weight Pt (based on the total titanium oxide powder) is set by adding uncoated titanium oxide. A commercially available ceramic flowthrough substrate having the cell density of 400 cpsi, 110 μm wall thickness is coated in the usual way with this washcoat. The coated substrate is then dried at 110° C. and calcined at 600° C. for 6 hours. The washcoat loading of the catalyst is 25 g/l, the platinum loading of the catalyst is 0.1059 g/l.

EXAMPLE K3

The catalyst is prepared identically to K2, wherein, however, a material having a concentration of 4% by weight Pt based on the titanium oxide powder is produced when the platinum precipitates from the aqueous solution onto the titanium oxide powder.

EXAMPLE K4

The catalyst is prepared identically to K2, wherein, however, a material having a concentration of 8% by weight Pt based on the titanium oxide powder is produced when the platinum precipitates from the aqueous solution onto the titanium oxide powder.

The catalysts K2, K3, and K4 are aged for 16 h at 800° C. under reducing conditions (10% $O_2$, 10% $H_2O$, remainder nitrogen) the ammonia conversion and the $N_2O$- and NO- concentration are measured after catalyst.

Figure 4:
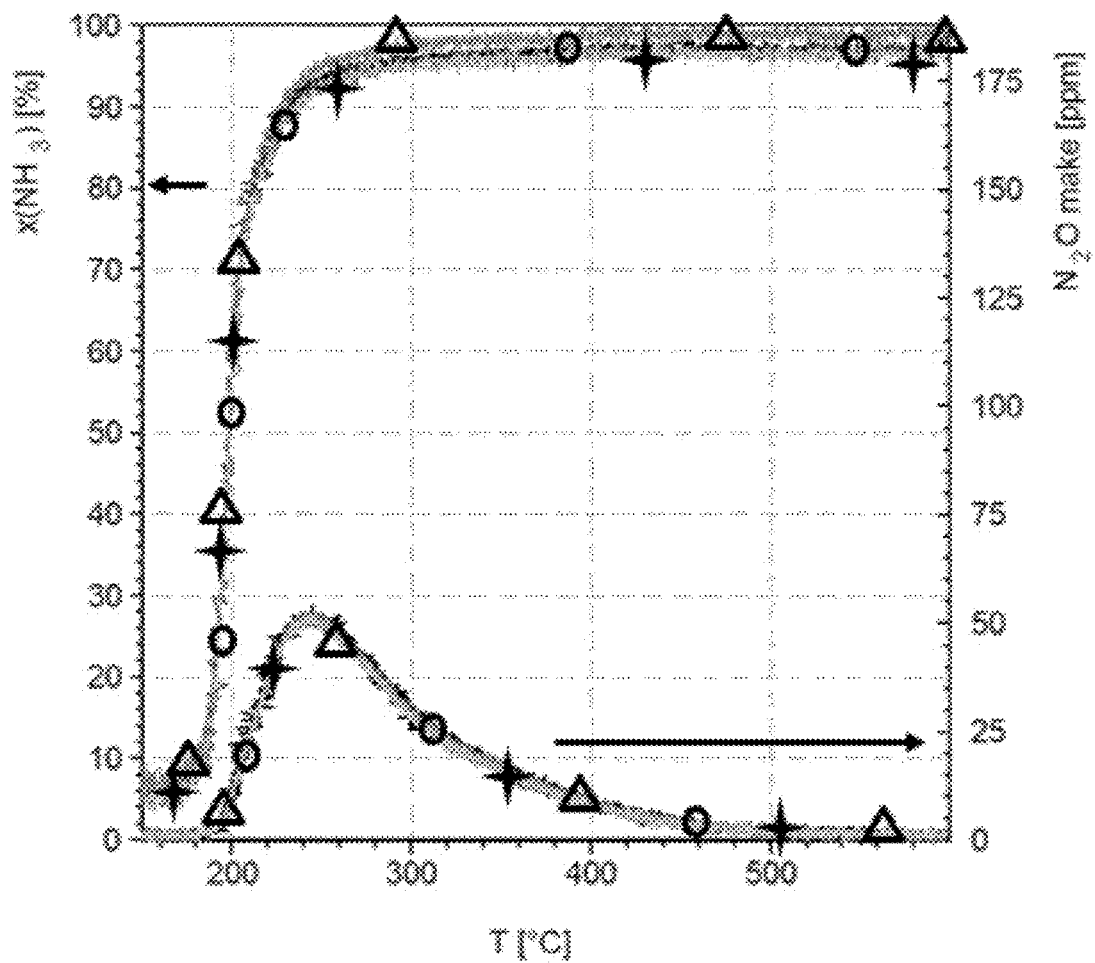

FIG. 4 comparatively shows the results of Examples K2 (circle), K3 (triangle), and K4 (star). As can be seen, the catalytic properties are almost identical, wherein a higher Pt loading of the titanium oxide powder reduces the amount of powder to be processed and thus also the production costs. A powder mixture produced by mixing Pt-containing powder with Pt-free powder is therefore a preferred variant of the substance according to the invention.

The invention claimed is:

1. Composition comprising platinum in the form of platinum particles supported on metal oxide A, characterized in that the platinum particles have an average particle diameter of 50-200 nm, wherein metal oxide A is titanium oxide.

2. Composition according to claim 1, characterized in that the platinum particles have an average particle diameter of 80-120 nm.

3. Composition according to claim 1, characterized in that the composition contains no further precious metal other than platinum.

4. Composition according to claim 1, characterized in that the titanium oxide comprises the crystalline phases anatase and rutile, and the anatase to rutile ratio is greater than 9:1.

5. Composition according to claim 1, characterized in that the platinum loading is 0.5-20% by weight based on the metal oxide A.

6. Composition according to claim 1, characterized in that the platinum loading is 3-8% by weight based on the metal oxide A.

7. Composition according to claim 1, characterized in that the metal oxide A contains silicon oxide, wherein the proportion of silicon oxide in the metal oxide A is 1 to 10% by weight.

8. Composition, characterized in that it comprises a composition according to claim 1 and metal oxide B, wherein metal oxide B equals metal oxide A.

9. Method for producing a composition according to claim 1, characterized in that the platinum is deposited from a solution on the metal oxide A and the composition is subjected to a thermal treatment at 700° C. to 900° C. after drying.

10. Catalyst comprising a composition according to claim 1, characterized in that the composition is applied to a carrier substrate of length L.

11. Catalyst according to claim 10, characterized in that the composition is applied to a carrier substrate over at least 80% of the entire length L.

12. Catalyst according to claim 10, characterized in that the composition is applied to a carrier substrate over a length of 10% to 80% of the carrier substrate length L.

13. Catalyst according to claim 10, characterized in that the composition is applied to a carrier substrate together with another catalytically active composition that is active for SCR reaction.

14. Catalyst according to claim 10, characterized in that the composition and another catalytically active composition are arranged in different zones and/or layers.

15. Catalyst according to claim 10, characterized in that the carrier substrate is a ceramic or metallic substrate.

16. Catalyst according to claim 10, characterized in that the carrier substrate is a flowthrough substrate.

17. Catalyst according to claim 16, characterized in that the flowthrough substrate is a corrugated substrate.

18. Catalyst according to claim 10, characterized in that the carrier substrate is a filter substrate.

19. Catalyst system, characterized in that it comprises a catalyst according to the invention in accordance with claim 10.

20. Method for reducing nitrogen oxides in exhaust gases of lean-burn internal combustion engines, wherein the exhaust gas is passed over an exhaust gas system that comprises a catalyst for the selective reduction of nitrogen oxides (SCR) and an ammonia slip catalyst (ASC) downstream of the exhaust gas stream, characterized in that the ASC is a catalyst according to the invention in accordance with claim 10.

21. Method according to claim 20, characterized in that the SCR catalyst is a vanadium oxide-based catalyst or a zeolite-based catalyst of the Fe-zeolite or Cu-zeolite type.

* * * * *